(No Model.) 5 Sheets—Sheet 1.
W. T. HOWARD.
POWER MEASURING INSTRUMENT FOR STEAM ENGINES.
No. 501,654. Patented July 18, 1893.
Fig 1.
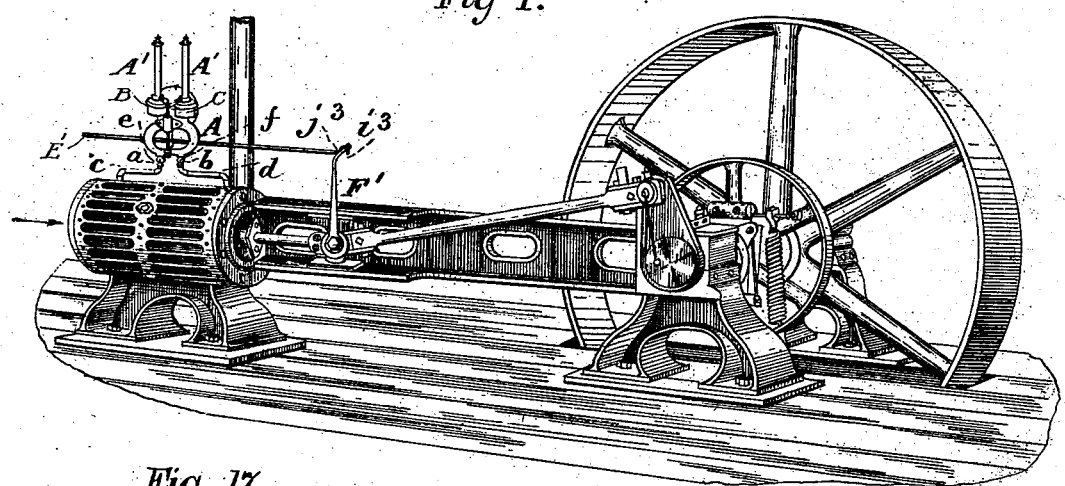
Fig 17.
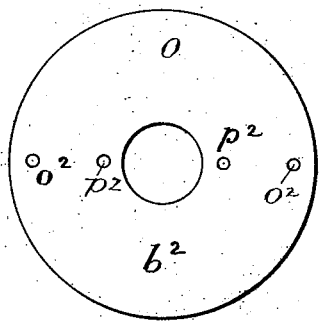
Fig 16.
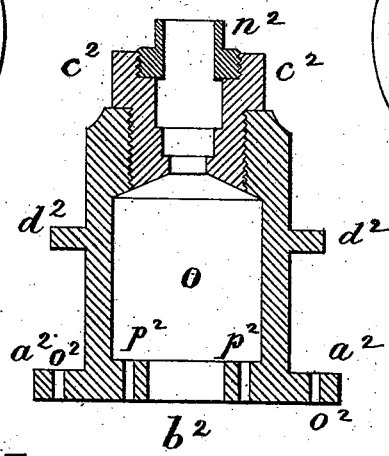
Fig 18.
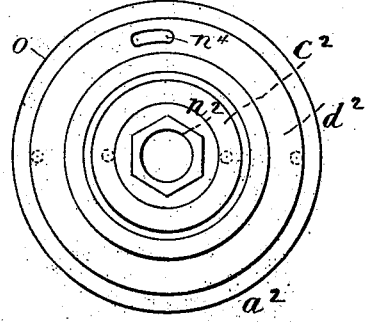
—WITNESSES—
Dan'l Fisher
A. Ruppert
—INVENTOR—
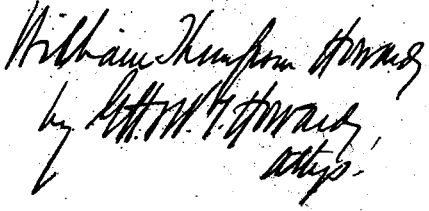
William Thompson Howard
by ... Attys.

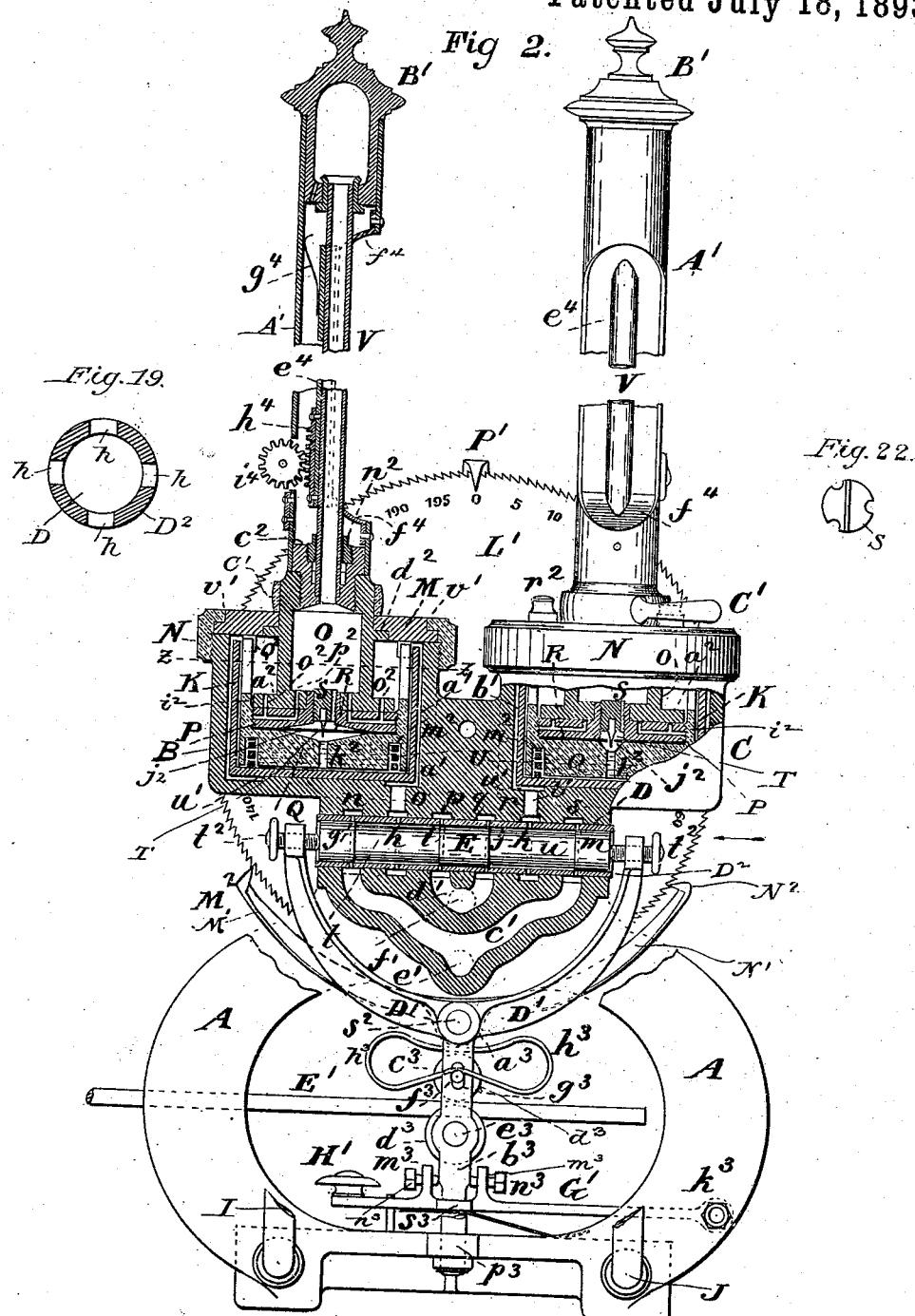

(No Model.) 5 Sheets—Sheet 3.
W. T. HOWARD.
POWER MEASURING INSTRUMENT FOR STEAM ENGINES.
No. 501,654. Patented July 18, 1893.
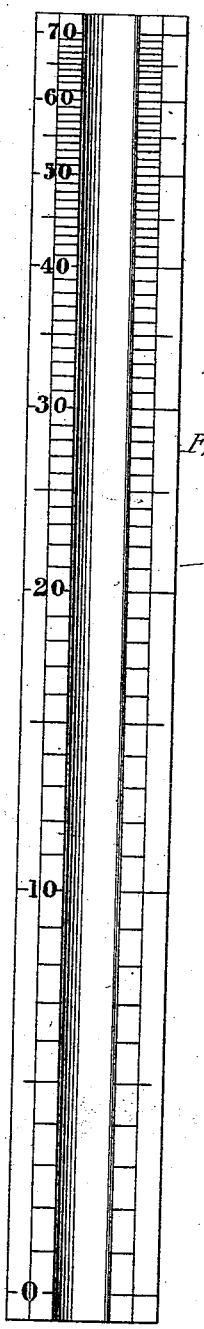
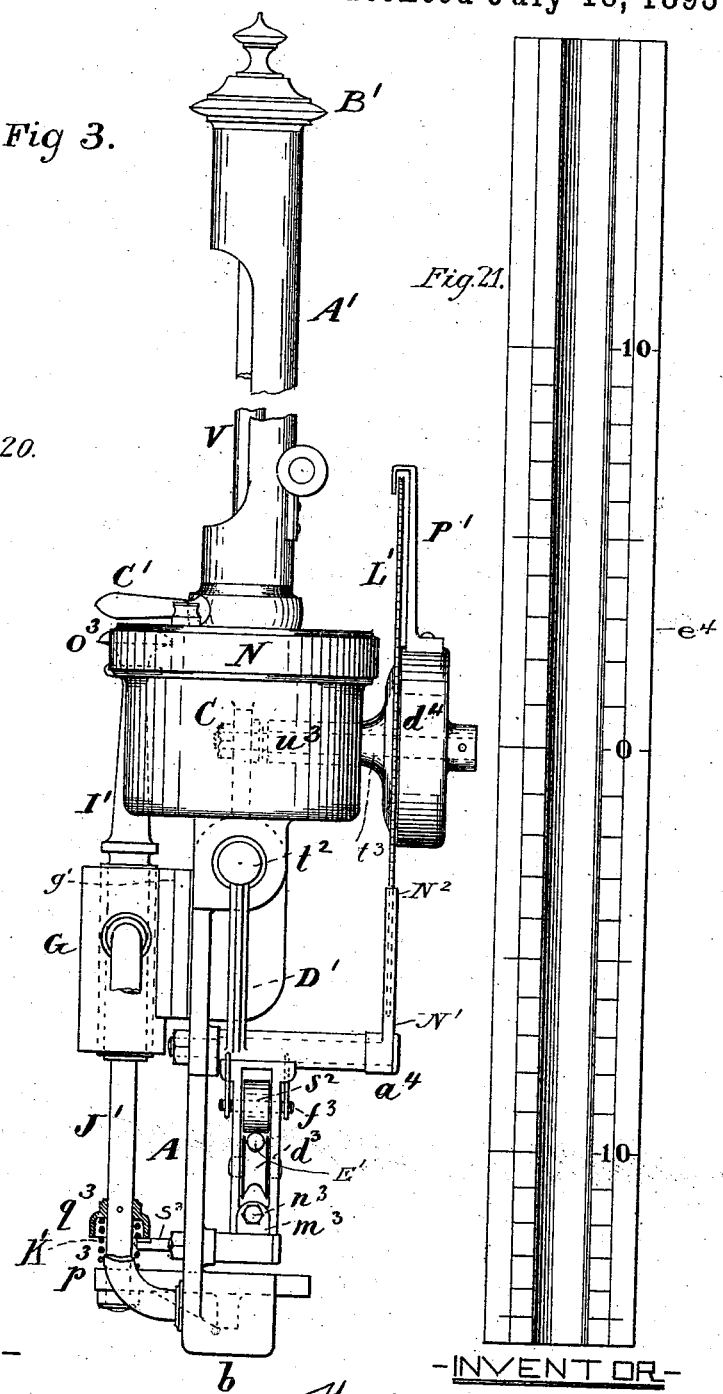
WITNESSES
INVENTOR
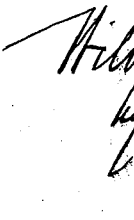

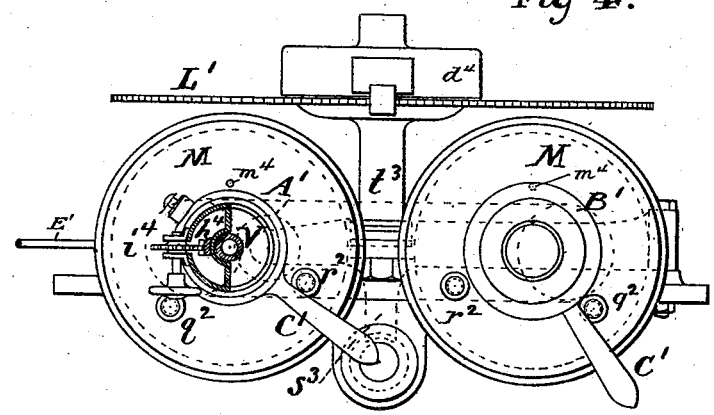
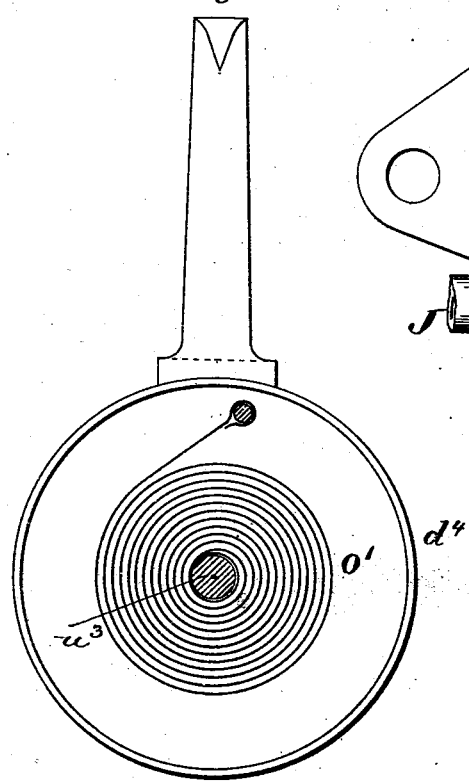
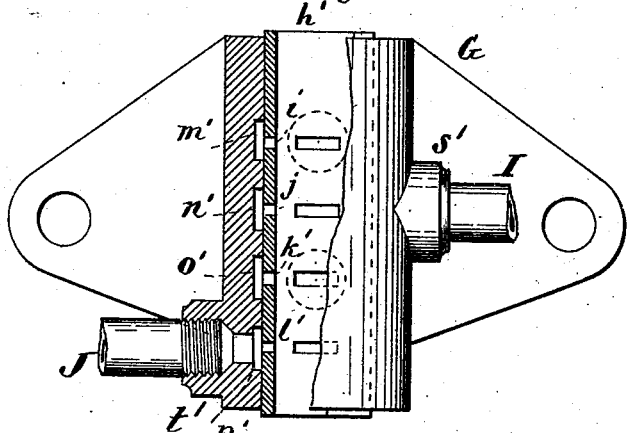
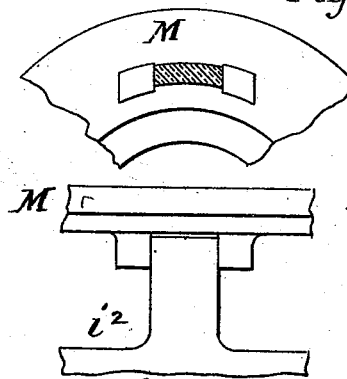
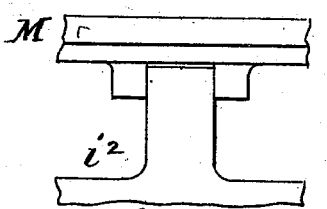

(No Model.) 5 Sheets—Sheet 5.
W. T. HOWARD.
POWER MEASURING INSTRUMENT FOR STEAM ENGINES.
No. 501,654. Patented July 18, 1893.
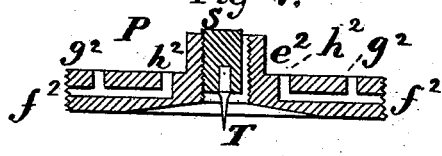
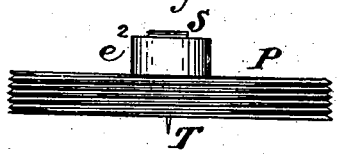
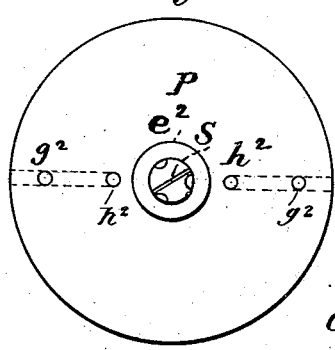
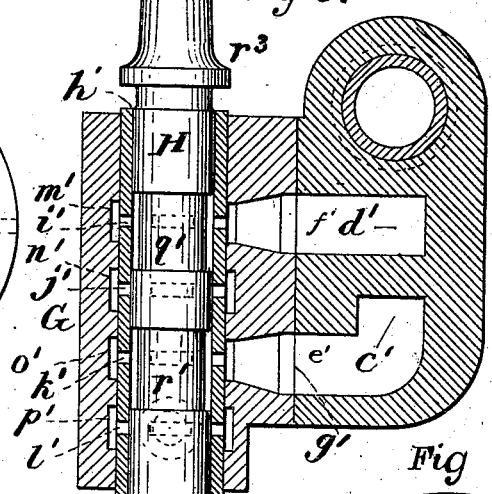
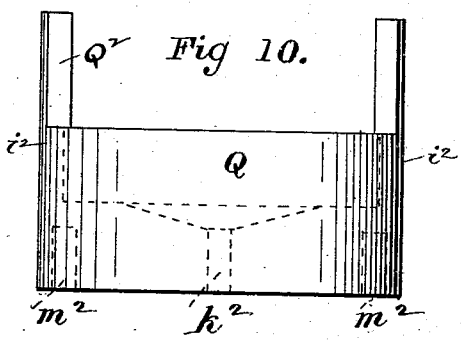
WITNESSES
Dan'l Fisher
A. Ruppert
INVENTOR
William Thompson Howard
by G. H. & W. T. Howard
attys.

UNITED STATES PATENT OFFICE.

WILLIAM THOMPSON HOWARD, OF BALTIMORE, MARYLAND.

POWER-MEASURING INSTRUMENT FOR STEAM-ENGINES.

SPECIFICATION forming part of Letters Patent No. 501,654, dated July 18, 1893.

Application filed November 19, 1892. Serial No. 452,537. (No model.)

*To all whom it may concern:*

Be it known that I, WILLIAM THOMPSON HOWARD, of the city of Baltimore and State of Maryland, have invented certain Improvements in Power-Measuring Instruments for Steam-Engines, of which the following is a specification.

This invention is based on the discovery which I have made, that the mean pressure of steam acting on the piston of a steam engine for a certain period of time may be accurately ascertained by computing or measuring the quantity or bulk of mercury forced or discharged through a small aperture by steam in communication with that acting on the piston, the capacity of discharge of the said aperture under various constant pressures for the same period of time being known. The time during which the steam is allowed to act on the body of mercury is not of vital importance. It may be a fraction of a minute, or two or more minutes; but as one minute is the unit of time used in computing horse power, that period is best suited for the purpose. One important advantage in extending the time to at least one minute, is that a fair average mean pressure may be obtained; as, during that period, in nearly all cases, all the various operations of the machinery driven by the engine will have been performed. To apply this principle of ascertaining the mean pressure of steam acting, on the piston of a non-condensing steam engine, I employ, primarily, a mercury-holding vessel having a small discharge aperture in communication with, or leading to, a measuring vessel, which for the sake of convenience consists of a glass tube; and use in connection therewith, suitable valve mechanism whereby the steam from the two ends of the cylinder is alternately brought in communication with the said said mercury holding vessel, so as to act upon, the body of mercury in the said vessel, and thereby force or discharge a portion of it to a mercury reservoir where it displaces a lighter liquid such as water or water and glycerine suitably colored, resting on the mercury and forces it up the said measuring vessel or glass tube by which means the average pressure, acting on both sides of the piston during a double stroke or series of double strokes, is ascertained. I further employ in connection with the first body of mercury a second body, a reservoir and a measuring-glass tube, to ascertain the retarding or back pressure on the piston; the valve mechanism before alluded to being so arranged that the forward pressure in all cases acts on one body of mercury, while the retarding or back pressure acts on the other. By this arrangement, I obtain two columns of mercury one representing the average forward, and the other the average back, pressure; and by deducting the figures indicating the latter from those representing the former, the mean effective pressure on the piston during the time to which the mercury is subjected to the action of the steam, is accurately ascertained. But to make the columns of mercury with their upper stratum of light liquid available for the purpose in view, it is necessary that scales should be prepared whereby the quantity or bulk of mercury discharged under various pressures may be readily computed; and to effect this, the bodies of mercury in the preparation of the instrument for use are subjected to different constant pressures for the unit of time fixed upon, one minute, and the heights attained by the columns of light liquid under the various constant pressures marked.

In practice, the operation of preparing the scales is as follows: Each body of mercury is subjected to a pressure of, say, five pounds, steam, air or water being used, for the space of one minute, and the height to which the colored column rises marked. The pressure is then removed and the mercury allowed to descend to its original height, which brings the surface of the colored liquid to its original level or the zero point, and a pressure of say ten pounds applied for the same period of time, after which the column is again allowed to descend to the zero point. This operation is continued with a successive advance in pressure at each trial, of say ten pounds, until the maximum pressure is reached. The ten pound spaces are then divided into pound spaces or less, thus completing the scale.

It is found in practice that divisions of ten pounds, ascertained by actual pressures, will give sufficient accuracy; but it is evident that every pound between the zero mark and the maximum pressure may be registered by actual trial or subjecting the mercury to each different pressure for the space of one minute.

In preparing the scale, a vertical scale line is drawn on a sheet of paper, and the heights of the pressure columns, ascertained as before described, and which represent pressures from, say, zero to eighty pounds marked thereon. From these points or marks are drawn horizontal lines, the first or zero line being the base. The base line which may be of any convenient length is then pointed off into eight equal spaces and perpendicular lines are erected from the division points, which are numbered to correspond with those on the scale line, or from zero to eighty. A curved line is then drawn through the points where the perpendicular and horizontal lines intersect which curved line represents in general outline a parabolic curve. The sub-divisions, to represent pounds, are then easily obtained by dividing the ten pound spaces on the base line into ten equal parts, and erecting perpendiculars from the points to intersect the parabolic curve, and extending horizontal lines from the intersecting points to the scale line.

In applying the invention to ascertain the horse power of condensing engines in which a portion of the pressure of the atmosphere is added to that of the steam acting on the engine piston, the colored liquid in the back pressure column will descend instead of ascending, and, to compute the proportion of the atmospheric pressure used, a second set of indicating numerals is marked on the back pressure scale, beginning at the zero point, the figures advancing in a downward direction. The pressure of the steam acting on the piston not being constant, it is evident that in the formation of a column the movement of the colored liquid in the glass tubes will vary, its speed of rise being faster at the beginning than at the termination of the stroke, but the bulk of mercury discharged with a varying pressure, the mean of which is, say, fifty pounds, will be the same as that discharged in the same time when, in forming the scale, a constant pressure of fifty pounds was used. For example, supposing the initial pressure on the piston to be one hundred pounds, and the steam cut off at one quarter of the stroke the terminal pressure will be about fourteen pounds, and the mean pressure about fifty-four pounds. At the beginning of the stroke, the discharge of mercury will be at the same rate as that which in the formation of the scale carried the column to the one hundred pound mark. But as the piston advances, the rapidity of discharge will decrease until, at the termination of the stroke, it will be at the rate of that when the fourteen pound mark was ascertained. Hence the rapidity of discharge will average the fifty-four pound rate, and, at the termination of the minute, the colored column will have reached the point indicated by that number on the scale. While this result is being reached in the forward pressure tube, the average back pressure is recorded on the scale applied to the other; and it is evident that the value of the two records obtained by deducting the back pressure from the forward one is the mean effective pressure acting on the piston for the space of one minute from which, the area and speed of piston being known, the horse power of the engine may be computed.

As the exact speed of the piston is a necessary element to be taken into consideration in computing the horse power of an engine, a secondary part of the invention consists in combining with the pressure-ascertaining devices before described, improved means whereby each complete or double stroke of the piston is registered, so that at the termination of the minute of trial, the aggregate number may be known, as will hereinafter appear.

In the further description of the invention which follows reference is made to the accompanying drawings forming a part hereof and in which—

Figure 1 is a perspective view of a steam engine provided with the improved power measuring instrument, illustrating, principally, the means employed for communicating motion from the crosshead of the engine to the instrument. Fig. 2 is a front view of the instrument alone, certain parts thereof being removed to show the interior. Fig. 3 is an exterior side view of the invention. Fig. 4 is a plan of Fig. 2. Figs. 5 to 22, inclusive, are details of the instrument on an enlarged scale.

Referring to the drawings, A is the frame of the instrument, having at the bottom two hollow bosses $a$ and $b$. The boss $a$ is in communication with one end of the engine cylinder, and the boss $b$ with the other end, the means of communication being the pipes $c$ and $d$, and the coupling cocks $e$ and $f$, shown in Fig 1.

Referring more particularly to Figs. 2, 3 and 4 B and C are cylindrical steam holding vessels supported by the frame A, and situated over the hollow bosses $a$ and $b$. Beneath the steam holding vessels B and C, is a chamber D for the cylindrical reversing valve E, hereinafter described. The cylindrical chamber D is formed of a fixed sleeve $D^2$ and has ports $g$, $h$, $i$, $j$, $k$, and $m$ in communication with the exterior annular openings, $n$, $o$, $p$, $q$, $r$ and $s$, see Figs. 2 and 19, the latter being an enlarged cross section of the sleeve $D^2$.

The reversing valve E consists of a cylindrical piston having recesses $t$ and $u$ formed by reducing the diameter of the piston at certain parts; and these recesses are arranged so that they will serve, in the longitudinal movement of the valve effected, as hereinafter described, to connect certain of the ports $g$, $h$, $i$, $j$, $k$ and $m$.

By reference to Fig. 2 it will be seen that the annular openings $o$ and $r$ are respectively in communication with the interiors of the steam holding vessels B and C through the medium of the apertures $a'$ and $b'$, and that the openings $n$ and $s$ are connected by the channel $c'$; and, further, that the openings $p$ and $q$ are united by the channel $d'$. The channels $c'$ and $d'$ have branch channels $e'$ and $f'$ leading to the outer face $g'$ of the valve chamber D, which face is flat.

G is a steam chest bolted to the face $g'$, and having a cylindrical valve chamber $h'$ with its ports $i'$, $j'$, $k'$, and $l'$, leading into annular spaces $m'$, $n'$, $o'$, and $p'$. The space $m'$ opens into the branch channel $f'$, and the space $o'$ into the branch channel $e'$. See Figs. 5 and 6. Within the valve chamber $h'$ is a piston valve H having two parts thereof, $q'$ and $r'$, reduced in diameter so that certain of the ports $i'$, $j'$, $k'$, and $l'$ may be made to communicate as and for a purpose hereinafter described. Opposite the annular spaces $n'$ and $p'$, and in communication with them, are (Fig. 6) hollow bosses $s'$ and $t'$, and these are respectively connected with the hollow bosses $a$ and $b$ by pipes I and J.

K K are cylindrical mercury-holding pots which stand on raised seats $u'$ in the steam holding vessels B and C. Fig. 2.

M M represent annular plates which constitute the lids of the steam holding vessels B and C. These plates are each held tightly in contact with the edge of its steam holding vessel by a threaded ring N having an inner peripheral lip $v'$ which rests in a rabbet in the lid.

O O (Figs. 16, 17 and 18) are inner mercury reservoirs, one for each steam holding vessel, fitting loosely in central apertures in the lids M, and extending downward into the pots K. These reservoirs have exterior flanges $a^2$ and bottoms $b^2$, and into their upper ends, which extend above the lids M, are screwed the plugs $c^2$. Fig. 16 is a vertical section of one of these mercury reservoirs, and Figs. 17 and 18 are, respectively, an under side, and a top view of the same.

The mercury reservoirs O are secured against upward movement by flanges $d^2$ which rest in circular depressions in the under side of the lids.

P P (Figs. 7, 8 and 9) are circular plate valves each having a central cylindrical projection $e^2$ which passes loosely through a hole in the bottom $b^2$ of its reservoir O. The said plate valves have each two horizontal channels $f^2$ extending from their circumferences to near the central cylindrical projections $e^2$, and also ports $g^2$ and $h^2$, leading from said channels $f^2$ to the upper faces of said valves which are in contact with the bottoms of the reservoirs O. The adjoining faces of the plate valves and reservoirs are true and form tight joints.

Figs. 7, 8 and 9 are respectively, a central cross section, an exterior edge, and a top view of one of the plate valves.

The plate valves P P are threaded, and screwed into the vertical flanges $i^2$ of the cylindrical blocks Q, (Figs. 10, 11 and 12;) and between the blocks and the plate valves are clamped thin spring-tempered steel diaphragms R, Fig. 2.

Figs. 10, 11 and 12 are respectively an exterior side, a top and an under side view of one of the blocks Q. The horizontal channels $f^2$ are to connect the ports $g^2$ and $h^2$, and the reason that they are extended to the threaded circumference is for convenience in drilling from the outside. The portion of the channels $f^2$ exterior of the ports $g^2$ has no useful office.

In the hollow projection $e^2$ of each of the plate valves P is screwed a grooved spindle S carrying a needle T with its point entering a small aperture $j^2$ in the center of the diaphragm R. By means of the threaded spindles and their needles the effective size of the apertures $j^2$ may be regulated.

The object in grooving the spindles S, as shown in Fig. 22 which is a top view of one of them, is to form passages between the spaces above the diaphragms R and the interiors of the reservoirs O. The adjustment of the needle points in the apertures $j^2$ of the said diaphragms is effected by means of a screw driver, the flat point of which is inserted in a cut in the upper end of the spindles S.

In the steam holding vessel B, the lower face of the plate valve P and the upper face of the cylindrical block Q, are dished in the center (Fig. 2) in order that a large portion of its diaphragm R may be exposed, and to give the necessary room for the diaphragm to bulge upward without striking the said plate valve. This diaphragm is allowed to bulge so that as the pressure of mercury under it increases, it will pass to a higher and larger part of the needle and thus decrease the effective size of the aperture $j^2$. Where the range of pressures is great, as say from two pounds to eighty, a hole of sufficient size to allow the mercury to pass at the lowest pressure would or might be too large to limit the discharge so that the colored liquid column would not be contained in the most convenient length of measuring glass tube. In other words, an aperture which would allow the colored column to ascend to near the top of the glass measuring tube with eighty pounds pressure exerted for the space of one minute would be too small to allow any mercury to pass through at the extreme low pressure of two pounds. With the bulging diaphragm as described the effective size of the aperture alters with the pressure on the mercury tending to force it through the aperture.

In the steam holding vessel C, the diaphragm R is not intended to bulge; and the dishing of the faces of the plate valve and the cylindrical block, is therefore dispensed with, the said diaphragm being clamped throughout its entire surface or nearly so. Each of the cylindrical blocks Q has a central hole $k^2$, which extends from its upper surface to its bottom, and serves to place the under surface of the diaphragm in communication with the interior of the cylindrical pot K, which surrounds it. The blocks Q are prevented from turning circumferentially by means of two ears $Q^2$ the upper ends of which rest between lugs $Q^3$ on the under side of the covering lids M of the steam holding vessels B and C.

U U are spiral springs situated in annular grooves $m^2$ in the blocks Q; and, as they bear against or rest on the bottoms of the pots K, they keep the plate valves P tightly against the faces of the reservoirs O, and also retain the flanges $d^2$ closely in contact with the recessed portions of the lids M, so as to form steam tight joints.

The plugs $c^2$ are bored out (Fig. 16) to form packing boxes into which measuring glass tubes V are inserted. The packing is held in place by the glands $n^2$.

A′ A′ (Fig. 2) are tubular protection-casings for the glass tubes V. They are fitted tightly around the plugs $c^2$ and are closed at their upper ends by ornamental caps B′, which are bored out and provided with soft washers serving to make dust proof joints. The protection casings are cut away at one side to expose the measuring tubes, as shown in Figs. 2 and 3. The bottoms of the ornamental caps are perforated, and the holes lead into the tubular protection casings for a purpose hereinafter described.

By referring to Figs. 16 and 17 it will be seen that in the bottoms and the exterior flanges of the reservoirs O, are ports $o^2$ and $p^2$. These ports, when the said mercury reservoirs are turned into one position, register with the ports $g^2$ and $h^2$ in the plate valves and thereby place the interiors of the reservoir and pot K of each steam holding vessel in full communication. The registration of the ports, as described, is effected by means of handles C′, secured to the portions of the reservoirs which project above the steam holding vessels B and C. See Figs. 2 and 4. Stops $q^2$ and $r^2$ on the lids M limit the circumferential movement of the handles C′ and the reservoirs to which they are fastened. When the handles are brought together and come in contact with the stops $r^2$, the ports $o^2$ and $p^2$ register with the ports $g^2$ and $h^2$, and the plate valves P then offer no obstruction to the passage of the contents of the reservoirs to the pots, or vice versa. But when the said ports are thrown out of register, by the handles being turned toward the stops $q^2$, all avenues of communication between the reservoirs and pots are cut off, except the apertures $j^2$ in the diaphragms R and the holes $k^2$ in the cylindrical blocks Q. The holes $k^3$ are merely supply channels to bring the under side of the perforated diaphragms in communication with the interior of the pots, and may be of any suitable size.

D′ (Figs. 2 and 3) is a curved rocker adapted to vibrate on a stud $s^2$, projecting backward from the frame A. The ends of this rocker have screws $t^2$ adapted as adjustable tappets to engage with the ends of the reversing valve E. The hub $a^3$ of this rocker has a tail piece $b^3$ in which are situated and adapted to turn two rollers $c^3$ and $d^3$. The lower roller $d^3$ is grooved at the edge, and the upper one $c^3$ is preferably plain or only slightly grooved. The lower roller $d^3$ has a fixed position with reference to the tail piece $b^3$ of the rocker D′, its spindle $e^3$ being in a circular hole in which it turns freely, but the spindle $f^3$ of the upper and plain roller is confined in a slot $g^3$ in order that the roller may have some vertical adjustment. Springs $h^3$ attached to the tail piece bear on the two ends of the spindle $f^3$ of the plain vertically adjustable roller $c^3$, which ends are slightly grooved for their reception, the springs tending to force the upper roller toward the lower one.

E′ (Figs. 1, 2, 3 and 4) is a rod which leads from some part of the engine having a movement in common with that of the piston. By reference to Fig. 1, it will be seen that the cross-head of the engine has an arm F′, temporarily or permanently bolted to it, and this arm, which is provided with a pin $i^3$, is bent so as to bring the pin $i^3$ directly in alignment with the space between the rollers $c^3$ and $d^3$. The rod E′ has a hook $j^3$ whereby it is connected to the pin $i^3$, of the arm F′, and it therefore moves in unison with the crosshead.

The rod E′ is forced tightly into the groove of the lower roller by the resilient action of the springs $h^3$.

G′ is a spring-supported bar hinged to the frame A at $k^3$, and having two lugs $m^3$ between which the end of the tail piece rests. The said lugs have screws $n^3$ which are so adjusted as to hold the tail piece firmly but not tightly in a vertical position, and the reversing valve E in a central one, when the bar G′ is at its highest point. But the extreme end of the tail piece is somewhat reduced in width, and when the bar is lowered or depressed so as to bring the ends of the screws $n^3$ opposite the narrow part, it, the tail piece, is susceptible of a slight swinging motion, but this motion is sufficient to effect a complete forward and backward stroke of the reversing valve E.

H′ is a knob whereby the bar G′ may be depressed by hand, to allow of the movement of the rocker and effect the reciprocating stroke of the reversing valve. When the bar G′ is depressed and the engine piston begins its stroke, the rod E′ moves the rocker until the tail piece $b^3$ comes in contact with one of the screws $n^3$, when all further motion in that direction is prevented, and the rod E′ merely passes on. The movement effected by the friction between the rod E′ and the rollers is, however, sufficient to move the reversing valve E and admit steam from the operative side of the piston to the interior of the steam holding vessel B, while the steam from the back of the piston, or that which retards its stroke, is brought in communication with the interior of the steam holding vessel C.

At the beginning of the return stroke of the engine piston, the rod E' reverses the position of the reversing valve E, and the forward steam from the other side of the engine piston is conducted to the vessel B and the back pressure steam to the vessel C. The motion of the reversing valve E is accomplished when the engine piston has moved on its stroke the distance of about one thirty-second part of an inch, and, during the remainder of the stroke of the engine piston, the rod E' is inoperative except that it serves to keep the said reversing valve in the position in which it has been forced, until the beginning of the reverse stroke of the engine piston.

The steam valve H (Fig. 5) has an operating stem I' with a knob $o^3$ at the top, and the length of the stem is such that the knob is situated immediately under the handles C' when they are brought together. Figs. 3 and 4. By this arrangement, the knob $o^3$ is not easily reached or touched except when the handles C' are separated; and this interference of the parts is availed of to prevent the steam valve being opened except when such opening can do no harm, as will hereinafter appear.

J' (Fig. 5) is a guiding stem leading from the bottom of the steam valve H down through a lug $p^3$ extending from the face of the frame A.

K' is a spiral spring coiled about the stem J' and confined endwise between the lug $p^3$ and a cupped collar $q^3$, to retain the steam valve yieldingly in its highest position, or that in which steam is cut off from the channels c' and d' which constitute the means of access to the ports of the reversing valve E.

The downward movement of the steam valve H is limited by a collar $r^3$ which comes in contact with the top of the steam chest. In order that in the depression of the steam valve H the bar G' may also be depressed, and the rocker D' thereby released so that the reversing valve E shall become operative, the said bar is provided with a lateral projection $s^3$ with which the edge of the cupped collar $q^3$ comes in contact in its downward motion. Figs. 3 and 4.

L' (Figs. 2 and 3) is a circumferentially toothed dial secured to a flanged sleeve $t^3$ adapted to turn loosely upon a fixed stud $u^3$ projecting rearward from the frame A.

M' and N' are pallet arms extending from the hub piece $a^4$ which is passed over and attached rigidly to a reduced portion at the end of the hub of the rocker D'. These pallet arms have spring steel pallets $N^2$ of the shape usually employed in escapements of clock movements, which engage with the teeth of the dial L'. The pallets and the teeth of the dial L' form the escapement, which in the oscillation of the rocker D' allows the dial to rotate one tooth for each double stroke of the engine piston. An ordinary clock spring O' (Fig. 15) is confined in a circular box $d^4$ rigidly attached to the stationary stud $u^3$, with its ends connected to pins on the stud and the toothed dial. The spring O' is wound by turning the dial L' in the direction opposite to that in which it is intended to move in the operation of the instrument, the pallets being formed of springs, as before stated, allowing of this winding operation.

P' is a pointer fastened to the top of the stationary spring box $d^4$ with its end bent over the toothed dial L', Figs. 2, 3 and 4.

The tubular protection casings A' (Fig. 2) are each provided with a scale plate $e^4$, which is marked to indicate the pressure figures obtained in accordance with the theory and operation hereinbefore stated, and the teeth of the dial L' are numbered as shown. Figs. 20 and 21 show the scale plates marked as described. The scale plates $e^4$ are forced forward and held against curved finishing pieces $f^4$ by means of springs $g^4$, one of which is shown in Fig. 2; and a slight vertical adjustment of each scale plate is obtained by means of a rack $h^4$ and a pinion $i^4$.

To prepare the instrument for use after the scale plates have been marked, the handles C' are both moved in, or toward each other, until they strike the inner stops. Fig. 4. By this movement of the handles, the ports $o^2$ and $p^2$ are opened or brought to register with the ports $g^2$ and $h^2$. The caps B' are then removed, and mercury is poured into the glass tubes until it rises in the pots K and the inner reservoirs O, to the dotted line z. In the charging of the instrument, the mercury will pass around the blocks Q and the spiral springs U, flow up through the holes $k^2$ and come in contact with the under side of the diaphragms R. A lighter liquid, such as water or water and glycerine, suitably colored, is now poured down the glass tubes onto the mercury in the reservoirs O until it rises to the zero point on the scale plates. The caps B' are then replaced. When a pot K with its reservoir and measuring glass tube is thus charged, any depression of mercury in the pot causes a rise in the glass tube, and as the area of the surface of mercury in the pot exterior of the reservoir is many times greater than the transverse area of the liquid column in the glass tube, a very slight fall of mercury will cause a very considerable rise of the colored liquid in the glass tube.

The rod E' which for the sake of convenience and to admit of its adaptation to engines of various sizes is in sections screwed together, is now connected to the arm F' rigidly attached to the engine crosshead, and the toothed dial turned around until the zero point is directly under the end of the pointer P'. The instrument is now ready for use.

Supposing the engine to be in operation, the rod E' is at first inoperative, the tail piece $b^3$ being firmly held by the screws $n^3$ in the lugs $m^3$ of the bar G', and the rod merely moves forward and backward without communicating any movement to the rocker D'. At this time the ports $j'$ and $l'$ of the steam chest are closed by the valve H, (see Fig. 5,) and no steam passing through the pipes $c$ and $d$, hollow bosses $a$ and $b$, and pipes I and J to the steam chest G, can therefore pass through said ports. The operator now takes his watch in hand, and, at the beginning of a minute, presses down the knob $o^3$ which opens the ports $j'$ and $l'$, and places the forward end of the steam cylinder in communication with the exterior of the reversing valve E by the way of the port $j'$, annular space around the reduced part $q'$ of the piston valve H, the port $i'$, the space $m'$, branch channel $f'$ and channel $d$. The other or back end of the steam engine cylinder is placed in communication with the exterior of the said reversing valve E through the port $l'$, the annular space around the reduced portion $r'$ of the piston valve H, the port $k'$, the space $o'$, the branch channel $e'$ and the channel $c'$. The depression of the valve H also liberates the tail piece of the rocker D', as before described. Now supposing the engine piston to be at the beginning of the forward stroke, and about to move in the direction indicated by the arrow in Fig. 1, the rod E' which moves in unison with the engine piston, during the first one thirty-second part of an inch of its stroke, pushes over the tail piece $b^3$ until it strikes one of the screws $n^3$ in a lug $m^3$ of the spring-supported bar G. In this movement, the reversing valve E is thrown in the direction indicated by the arrow in Fig. 2, which opens the port $g'$ and places the interior of the steam holding vessel B in communication with the channel $c'$, to which forward or ahead steam from the back end of the steam cylinder, and behind the piston, has been admitted, as before described, by the way of the annular opening $n$, the recess $t$ in the reversing valve E, the port $h$, the annular opening $o$, and the aperture $a'$. At the same time, the port $j$ is opened, and the interior of the steam holding vessel C is brought in communication with the channel $d'$ which receives any back pressure or retarding steam that may be acting against the piston, as before described, by the way of the annular opening $q$, the recess $u$ in the reversing valve E, the port $k$, the annular opening $r$ and the aperture $b'$. From the foregoing description it will be seen that the mercury in the steam holding vessel B is now subjected to the forward or ahead steam, and the mercury in the steam holding vessel C to the back pressure or retarding steam, and this condition of things continues until the piston has completed its single stroke. The mercury in the pots owing to the pressure of steam on its surface, or that portion of its surface exterior of the reservoirs, is slowly depressed and the body of mercury in the reservoirs raised, the means of communication between the two bodies being as before stated the small aperture $j^2$. By the increase in volume of mercury in the reservoirs, the light liquid (water and glycerine) standing thereon is forced up the glass tubes. At the beginning of the return stroke, the reversing valve is reversed in position, and the ports $i$ and $m$ are opened, which brings the interior of the steam holding vessel B in communication with the channel $d'$ which then contains forward or ahead steam from the forward end of the steam engine cylinder, and the interior of the steam holding vessel C is brought in communication with the channel $c'$ which then contains back pressure or retarding steam from the back end of the steam engine cylinder. From this it will be understood that no matter in which direction the engine piston moves, the steam holding vessel B always receives the forward or ahead steam, and the other vessel C, the back pressure or retarding steam. At the completion of the minute, the operator releases the knob $o^3$ which stops the operation of the instrument, and he then notes the heights of the two columns of colored liquid as indicated by the figures on the scale plates. The figures indicating the back pressure must now be deducted from those indicating the ahead or forward pressure, and the remainder is the mean effective pressure to which the piston has been subjected during the minute. During the displacement of the mercury and the rise of the colored liquid columns, the toothed dial L' has been turning with an intermittent movement, the distance of one tooth for each double stroke of the engine piston, or complete revolution of the engine, and when the movement of the instrument is stopped, the pointer P' will indicate the number of double strokes or complete revolutions made by the engine during the minute. From the data furnished in figures, as described, the area of the engine piston in inches, and the distance traveled by the piston in feet during each double stroke, being known, the average horse power developed by the engine during the minute may be ascertained by the well known rule used in such cases. The operation of ascertaining the power of the engine being ended, the liquid columns are allowed to fall by turning the plate valves P by means of the handles C', and after the handles are replaced or moved to their original position, the instrument is again ready for use. In turning the handles so as to allow the liquid columns to recede, they are brought over the knob $o^3$ and thereby prevent, or render difficult, the opening of the steam valve, which should not be opened until the ports $o^2$, and $p^2$, are closed or brought out of register with the others $g^2$ and $h^2$.

To let off any steam left inclosed in the vessels B and C at the end of the indicating operation and which would prevent or retard the communicating bodies of mercury coming to a common level, the lids are each provided with a small hole $m^4$ which, as the handles are turned inward, registers with another hole $n^4$ in the flange of each of the reservoirs. See Figs. 4 and 18.

In ascertaining the horse power of a condensing engine, the back pressure column is lowered instead of raised, by reason of the existence of a partial vacuum on the back of the engine piston, and in computing the effective pressure on the piston, the number registered by this column must be added to, instead of subtracted from, the other, as will be readily understood.

The reason for having the zero points adjustable by means of rack and pinion, as described, is to obviate the necessity of great accuracy in pouring in the colored liquid in the glass tubes and also to provide for any evaporation of the said liquid when the instrument has been in use for a great length of time.

I claim as my invention—

1. The method of ascertaining the average pressure of steam in an engine cylinder, herein described, which consists in subjecting a body of mercury in a vessel having a limited discharge aperture of known capacity, to the same steam pressure, and measuring the mercury discharged, substantially as specified.

2. The method of arriving at the average of a varying pressure of steam acting on a moving engine piston during a given period of time, herein described, which consists in subjecting a body of mercury in a vessel having a limited discharge aperture, to steam in communication with that affecting the said piston, and comparing the quantity of mercury discharged from the said vessel with another quantity discharged through the same or a similar aperture under a constant pressure, for the same, or a certain proportion of the same, period of time, substantially as specified.

3. In a power measuring instrument, the combination of a mercury holding vessel having a limited discharge opening, a pipe to convey steam to the surface of the contained mercury, and a measuring vessel to ascertain the volume of the discharged mercury, substantially as specified.

4. In a power measuring instrument, the combination of a mercury holding vessel having a limited discharge aperture, a measuring vessel to ascertain the volume of the discharged mercury, a pipe whereby pressure is applied to the surface of the contained mercury, and valve mechanism to control the said applied pressure, substantially as specified.

5. In a pressure measuring instrument, the combination of a mercury holding vessel having a limited discharge aperture, a measuring vessel to ascertain the volume of the discharged mercury, a pipe leading from the space in the mercury-holding vessel above the contained mercury to one end of an engine cylinder, a second pipe leading from the said space above the mercury to the other end of the said engine cylinder, and valve mechanism whereby the said vessel may be placed alternately in communication with each end of the said steam cylinder, substantially as specified.

6. In a pressure measuring instrument, the combination of a mercury holding vessel having a limited discharge, a measuring vessel to ascertain the volume of the discharged mercury, a pipe leading from the surface of the contained mercury to one end of a steam engine cylinder, a second pipe leading from the surface of the mercury to the other end of the said engine cylinder, valve mechanism whereby the said mercury-holding vessel may be placed alternately in communication with each end of the said steam engine cylinder, and means whereby the said valve mechanism is actuated by the piston of the steam engine and in unison with its movement, substantially as specified.

7. In a pressure measuring instrument, the combination of two mercury holding vessels, each one of which is provided with a limited discharge and with a measuring vessel to ascertain the volume of the discharged mercury, a pipe leading from above the surface of the mercury in the two vessels to one end of an engine cylinder, a second pipe leading from the same place to the other end of the said engine cylinder, and valve mechanism actuated primarily from the piston of the engine whereby, in the operation of the engine, the forward steam from each end of the steam cylinder is alternately admitted to one mercury holding vessel, and the back pressure steam from each end of the steam cylinder to the other mercury holding vessel, substantially as specified.

8. In an instrument for ascertaining the power of a steam engine, devices for registering the mean effective pressure of steam acting on the engine piston for a certain period of time, and devices for registering the revolutions of the engine for the same period of time, combined with mechanism whereby the two sets of devices are simultaneously placed in operation, substantially as specified.

9. In a pressure measuring instrument, consisting primarily of a mercury holding vessel having a limited discharge leading to a measuring vessel, a valve which controls the action of steam from the cylinder of a steam engine on the surface of the contained mercury, and actuating mechanism for the said valve having a limited movement less than the stroke of the engine piston, combined with a device operated by the engine piston and having a movement in unison therewith, which device is connected with the said valve actuating mechanism and imparts only a portion of its movement thereto, whereby the said controlling valve is operated at the beginning of each single stroke of the piston, and then held in its position until the completion of the said single stroke substantially as specified.

10. In a pressure measuring instrument, the combination of a valve, a valve-operating pivoted rocker with a vibratory tail piece, a rod connected with some part of an engine having a movement in unison with the engine piston, the free end of which rod passes through the vibratory tail piece, and friction producing devices or rollers forming a part of the tail piece to clamp the said rod and serve to communicate the first part of its motion to the said valve-operating rocker, substantially as specified.

11. In a pressure measuring instrument, the combination of a steam holding vessel containing mercury, and a mercury reservoir inserted in the said steam holding vessel with its end, which is immersed in the mercury, provided with a small aperture, whereby, as pressure is applied to the surface of the mercury exteriorly of the reservoir, the mercury is made to rise in the said reservoir, substantially as specified.

12. In a pressure measuring instrument, the combination of a steam holding vessel containing mercury, a mercury holding vessel having at its lower end a valve which may be opened and closed, and also a diaphragm having a small aperture which is at all times open, the said aperture forming a constant means of communication between the mercury holding portion of the steam holding vessel, and the interior of the reservoir, substantially as specified.

13. In a pressure measuring instrument, the combination of a steam holding vessel containing mercury, a mercury holding reservoir having at its lower end a ported plate valve which is immersed in the mercury, and also a diaphragm secured to the plate valve having a small aperture which is never closed and forms a means of communication between the steam holding vessel and the interior of the reservoir, substantially as specified.

14. In a pressure measuring instrument, the combination of a steam holding vessel in which is inserted a reservoir having a controllable opening and a non-controllable aperture, both of which serve as means of communication between the steam-holding vessel and the reservoir, and a measuring tube leading from the upper end of the said reservoir, substantially as specified.

15. A power measuring instrument, which consists of a steam holding vessel having an apertured reservoir in communication with the said vessel, valve mechanism whereby the admission of steam to the said vessel is controlled, and means whereby a motion in unison with the engine piston is communicated to the valve mechanism, combined with a dial and an escapement whereby, at each complete stroke of the engine, the dial is allowed or made to perform a part of a revolution, substantially as specified.

16. In a power measuring instrument, a reversing valve, substantially as described, combined with an actuating pivoted rocker having a tail piece with friction rollers therein, a rod leading from some part of an engine having a movement in common with the engine piston, which is clamped between the friction rollers, and a holding and releasing bar whereby the movement of the said rod may be made operative or inoperative to communicate motion to the said rocker, substantially as specified.

17. In combination with some part of a steam engine having a movement for each stroke of the engine piston, a spring wound toothed dial, and escapement pallets connected to the said part of the engine, whereby at each stroke of the said engine piston, the dial is allowed to make a partial revolution, substantially as specified.

WILLIAM THOMPSON HOWARD.

Witnesses:
EDWIN CRUSE,
J. M. POND.